US008213525B2

(12) United States Patent
Caire et al.

(10) Patent No.: US 8,213,525 B2
(45) Date of Patent: Jul. 3, 2012

(54) METHOD OF ESTIMATING AND REMOVING NOISE IN OFDM SYSTEMS

(75) Inventors: Giuseppe Caire, South Pasadena, CA (US); Tareq Y. Al-Naffouri, Dhahran (SA); Ahmed Abdul Quadeer, Karachi (PK)

(73) Assignee: King Fahd University of Petroleum and Minerals, Dhahran (SA)

( * ) Notice: Subject to any disclaimer, the term of this patent is extended or adjusted under 35 U.S.C. 154(b) by 558 days.

(21) Appl. No.: 12/457,848

(22) Filed: Jun. 23, 2009

(65) Prior Publication Data

US 2010/0322327 A1 Dec. 23, 2010

(51) Int. Cl.
*H04K 1/10* (2006.01)
(52) U.S. Cl. ........ 375/260; 375/295; 375/316; 375/262; 375/263; 375/285; 375/346; 375/347
(58) Field of Classification Search .................. 375/260, 375/295, 316, 262, 263, 285, 346, 347
See application file for complete search history.

(56) References Cited

U.S. PATENT DOCUMENTS

| 4,303,808 | A | * | 12/1981 | Oswald ........................ 370/248 |
|---|---|---|---|---|
| 7,453,793 | B1 | | 11/2008 | Jones et al. |
| 7,809,076 | B1 | * | 10/2010 | Ghobrial et al. .............. 375/285 |
| 2005/0213692 | A1 | * | 9/2005 | Zhidkov ....................... 375/346 |
| 2006/0098750 | A1 | | 5/2006 | Zhidkov |
| 2007/0030913 | A1 | | 2/2007 | Lin |
| 2007/0036064 | A1 | | 2/2007 | Song et al. |
| 2007/0036239 | A1 | | 2/2007 | Ma et al. |
| 2007/0133700 | A1 | | 6/2007 | Kim et al. |
| 2007/0147558 | A1 | * | 6/2007 | Hsiung et al. ................ 375/346 |
| 2007/0280097 | A1 | | 12/2007 | Yang et al. |
| 2008/0095256 | A1 | | 4/2008 | Primo et al. |
| 2008/0130771 | A1 | | 6/2008 | Fechtel et al. |
| 2008/0310484 | A1 | * | 12/2008 | Shattil ........................... 375/146 |
| 2009/0097596 | A1 | * | 4/2009 | Li et al. ......................... 375/341 |
| 2010/0151871 | A1 | * | 6/2010 | Zhang et al. .................. 455/450 |

FOREIGN PATENT DOCUMENTS

| CN | 1917397 A | 2/2007 |
|---|---|---|
| CN | 101345727 A | 1/2009 |
| EP | 1320232 A2 | 6/2003 |
| JP | 2006054840 A | 2/2006 |
| WO | WO03073683 A1 | 9/2003 |
| WO | WO2008118514 A2 | 10/2008 |
| WO | WO2009032385 A1 | 3/2009 |

OTHER PUBLICATIONS

NPL of "Impulse noise cancellation in OFDM: an application of compressed sensing" by Giuseppe Caire, Tareq Y. Al-Naffouri, and Anand Kumar Narayanan, dated Jul. 6-11, 2008.*

* cited by examiner

*Primary Examiner* — Siu Lee
(74) *Attorney, Agent, or Firm* — Richard C. Litman

(57) ABSTRACT

The present invention relates to impulse noise estimation and removal in orthogonal frequency division multiplexing (OFDM) transmissions, and particularly to transmissions in power line communications and digital subscriber line (DSL) transmissions. The method includes the steps of: modulating data to be transmitted; performing an inverse fast Fourier transform; inserting a cyclic prefix into the data; transmitting the data as a set of OFDM symbols via a channel; receiving the set of OFDM symbols; removing the cyclic prefix; performing a fast Fourier transform; estimating impulse noise; canceling the impulse noise based upon the estimated impulse noise to produce a set of impulse noise-free data; estimating the channel; and demodulating and detecting the data transmitted based upon the estimated channel and the set of impulse noise-free data.

16 Claims, 12 Drawing Sheets ns and digital subscriber line (DSL) 10
METHOD OF ESTIMATING AND REMOVING NOISE IN OFDM SYSTEMS

BACKGROUND OF THE INVENTION

1. Field of the Invention

The present invention relates to impulse noise estimation and removal in orthogonal frequency division multiplexing (OFDM) transmissions, and particularly to transmissions in power line communications and digital subscriber line (DSL) transmissions.

2. Description of the Related Art

Signal transmissions, such as those delivered via power line communications and digital subscriber line (DSL) transmission, must cope with intersymbol interference (ISI) distortion, additive white Gaussian noise (AWGN) and impulse noise. In telecommunication, intersymbol interference is a form of distortion of a signal in which one symbol interferes with subsequent symbols. This is an unwanted phenomenon, as the previous symbols have similar effect as noise, thus making the communication less reliable. ISI is often caused by multipath propagation and the inherent non-linear frequency response of a channel. ISI arises due to imperfections in the overall frequency response of the system. The presence of ISI in the system, however, introduces errors in the decision device at the receiver output. Therefore, in the design of the transmitting and receiving filters, the objective is to minimize the effects of ISI, and thereby deliver the digital data to its destination with the smallest error rate possible. Common techniques to fight against intersymbol interference include adaptive equalization and error correcting codes.

In communications, the additive white Gaussian noise channel model is one in which the information is given a single impairment, i.e., a linear addition of wideband or white noise with a constant spectral density (typically expressed as Watts per Hertz of bandwidth) and a Gaussian distribution of noise samples. The model does not account for the phenomena of fading, frequency selectivity, interference, nonlinearity or dispersion. However, it produces simple and tractable mathematical models that are useful for gaining insight into the underlying behavior of a system before these other phenomena are considered.

Wideband Gaussian noise comes from many natural sources, such as the thermal vibrations of atoms in antennas (referred to as thermal noise or Johnson-Nyquist noise), shot noise, black body radiation from the Earth and other warm objects, and from celestial sources such as the Sun. As an example of noise in signal transmissions, ADSL/VDSL over short distances operates at an extremely high signal-to-noise ratio (SNR) with very high spectral efficiencies (quadrature amplitude modulation, or "QAM", constellations of up to $2^{15}$ points can be used), and their main limiting factor is impulse noise and cross-talk, rather than AWGN. As will be described in greater detail below, impulse noise estimation and cancellation at the receiver is of particular interest and importance.

Impulsive noise is considered one of the biggest challenges in DSL technology and OFDM transmission in general. While impulsive noise is often attributed to switching electronic equipment, there is no general consensus as to the proper modeling of impulsive noise. There are various ways to deal with errors that take place at the physical layer in DSL. Forward error correction is one common way of counteracting, or accounting for, such errors. Specifically, a superframe in DSL implements an inner convolutional code with an interleaver and a Reed-Solomon outer code. The interleaver spreads the impulse noise errors around the signal, allowing the code redundancy to better deal with these errors.

Alternatively, other common techniques attempt to detect the presence of impulses and their locations, and use this information to enhance the performance of forward error correction (FEC). One common method detects the presence of an impulse using a thresholding scheme, and then erases the whole OFDM block in order not to exceed the error correction capability of the channel coding. Most standardized approaches try to detect or forecast the location of the errors. With this knowledge, one can theoretically detect twice as many errors as when the location of the errors is unknown. When the physical layer is not able to deal with erasures through forecasting and FEC, the physical layer tags the uncertain discrete multitone (DMT) symbols and sends them to higher layers.

Pre-coding techniques and frequency algebraic interpolation techniques inspired by Reed-Solomon coding and decoding over the complex numbers have been proposed to cope with this problem. Specifically, the presence of impulse noise within a few samples creates certain syndromes in a sequence of pilots or null frequencies, which can be used to detect the location of impulse noise, estimate it, and cancel the noise. The problems with such techniques are that they require a certain structure of the null frequencies or pilots, they are guaranteed to detect only a limited number of impulse noise samples, and they can be very sensitive to background noise (to the extent that some intermediate step is needed to ensure that the algorithm does not malfunction).

In FIG. 3, the relevant time-domain complex baseband equivalent channel is given by:

$$y_k = \sum_{l=0}^{L} h_l x_{k-l} + z_k + e_k \quad (1)$$

where $x_k$ and $y_k$ denote the channel input and output, $h=(h_0, \ldots, h_L)$ is the impulse response of the channel, $z_k$ represents AWGN and is independent and identically distributed (i.i.d.) drawn from a zero mean normal distribution with variance $N_0$ (the noise), or $\sim(0, N_0)$, and $e_k$ is an impulsive noise process, which, for purposes of this analysis, is assumed to be Bernoulli-Gaussian, i.e., $e_k = \lambda_k g_k$, where $\lambda_k$ are i.i.d. Bernoulli random variables, with $P(\lambda_k=1)=p$, and $g_k$ are i.i.d. Gaussian random variables $\sim CN(0, I_0)$. The channel SNR is defined as $E_x/N_0$, and the impulse to noise ratio (INR) is defined as $I_0/N_0$.

FIG. 3 illustrates a typical, simplified OFDM prior art system 100, including transmitter T, receiver R and an intermediate channel C. Here, the channel model of equation (1) takes the matrix form:

$$y = Hx + e + z \quad (2)$$

where y and x are the time-domain OFDM receive and transmit signal blocks (after CP removal) and $z \sim CN(0, N_0 I)$. The vector e is an impulse noise process and, specifically, e is a random vector with support $\mathcal{S}(e)$ (a set of the non-zero components) uniformly distributed over all $$\binom{m}{s}$$

possible supports of cardinality $s \ll m$, and i.i.d. non-zero components $\sim CN(0, I_0)$.

Due to the presence of the cyclic prefix, H is a circulant matrix describing the cyclic convolution of the channel impulse response with the block x. Letting F denote a unitary discrete Fourier transform (DFT) matrix with (k, l) elements $$[F]_{k,l} = \frac{1}{\sqrt{n}} e^{-j2\pi kl/n},$$

with k,l∈{0, ..., n−1}, the time domain signal is related to the frequency domain signal by:

$$x = \frac{1}{\sqrt{n}} F^H \check{x} \quad (3)$$

and, furthermore, given a circulant convolution matrix H, $$H = F^H DF \quad (4)$$

where $D=\text{diag}(\check{h})$ and $\check{h}=\sqrt{n}FH$ is the DFT of the channel impulse response (whose coefficients are found, by construction, on the first column of H).

Demodulation amounts to computing the DFT, as given in equation set (5) below:

$$\begin{aligned} \check{y} &= Fy \\ &= \text{diag}(H_0, \ldots, H_{m-1})\check{x} + F^H z + F^H e \\ &= D\check{x} + \check{z} + Fe \end{aligned} \quad (5)$$

where $$H_i = \sum_{k=0}^{L} h_l e^{j\frac{2\pi}{n}li}$$

are the DFT coefficients of the channel impulse response, and $\check{z}=Fz$ has the same distribution of z. Without impulsive noise, it is well known that equation set (5) reduces to a set of m parallel Gaussian channels: $\check{y}_i = H_i \check{x}_i + \check{z}_i$, for i=1, ..., m.

In the presence of the impulsive noise, the performance of a standard OFDM demodulator may dramatically degrade since even a single impulse in an OFDM block may cause significant degradation to the whole block. This is because $\check{e}=Fe$ can have a large variance per component, and, thus, affects more or less evenly all symbols of the block.

Thus, a method of estimating and removing noise in OFDM systems solving the aforementioned problems is desired.

SUMMARY OF THE INVENTION

The present invention relates to impulse noise estimation and removal in orthogonal frequency division multiplexing (OFDM) transmissions, and particularly to transmissions in power line communications and digital subscriber line (DSL) transmissions. Any suitable types of transmitters, receivers or transceivers may be utilized. The method includes the steps of: (a) modulating data to be transmitted by a transmitter; (b) performing an inverse fast Fourier transform on the modulated data; (c) inserting a cyclic prefix into the transformed, modulated data; (d) transmitting the transformed, modulated data as a set of OFDM symbols via a channel; (e) receiving the set of OFDM symbols on a receiver; (f) removing the cyclic prefix from the set of OFDM symbols; (g) performing a fast Fourier transform on the set of OFDM symbols; (h) estimating impulse noise in the transformed set of OFDM symbols; (i) canceling the impulse noise in the transformed set of OFDM symbols based upon the estimated impulse noise to produce a set of impulse noise-free data; (j) estimating the channel; and (k) demodulating and detecting the data transmitted based upon the estimated channel and the set of impulse noise-free data.

The channel may be estimated using blind, semi-blind or pilot-based methods. The impulse noise may be estimated by insertion of free carriers either randomly across the entire available frequency spectrum, or only within the guard bands thereof. Preferably, the impulse noise is estimated by first estimating the coarse support of the impulses, then refining the support of the impulses, and then estimating the amplitudes of the impulses.

Coarse support is preferably performed by a Compressive Sensing (CS) method, which may utilize the Candes-Randall-Tao SOCP Estimator algorithm, the Candes-Randall-Tao LP Estimator algorithm, or the Tropp $l_1$-penalty Estimator algorithm. Refinement of the support may be performed by using a maximum likelihood (ML) method or a maximum a-posteriori probability (MAP) method. Estimation of the amplitudes may be calculated via the least squares (LS) method or the mean square error (MMSE) method.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
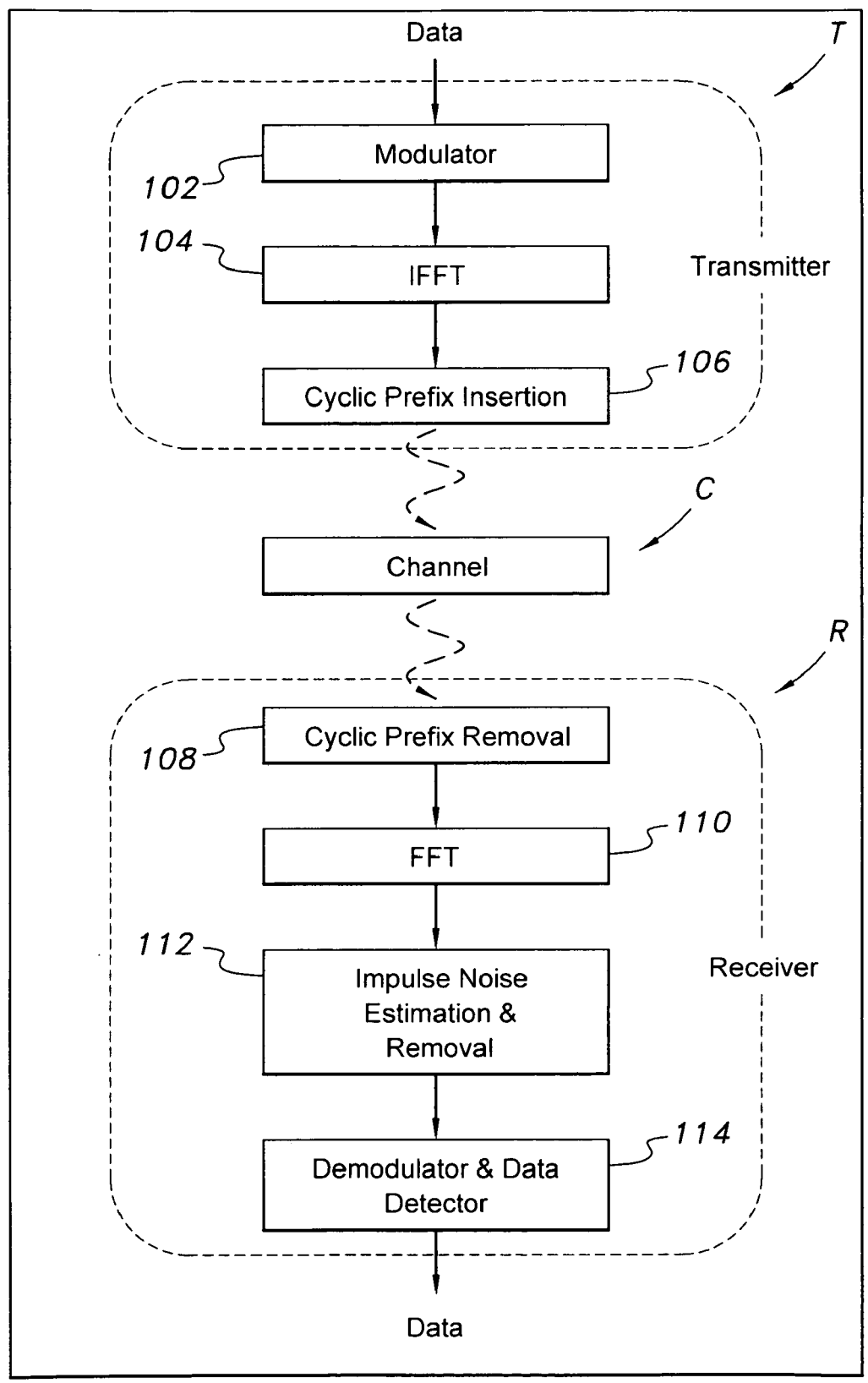
FIG. 1 is a diagrammatic overview of a system implementing a method of estimating and removing noise in OFDM systems according to the present invention.
Figure 2:
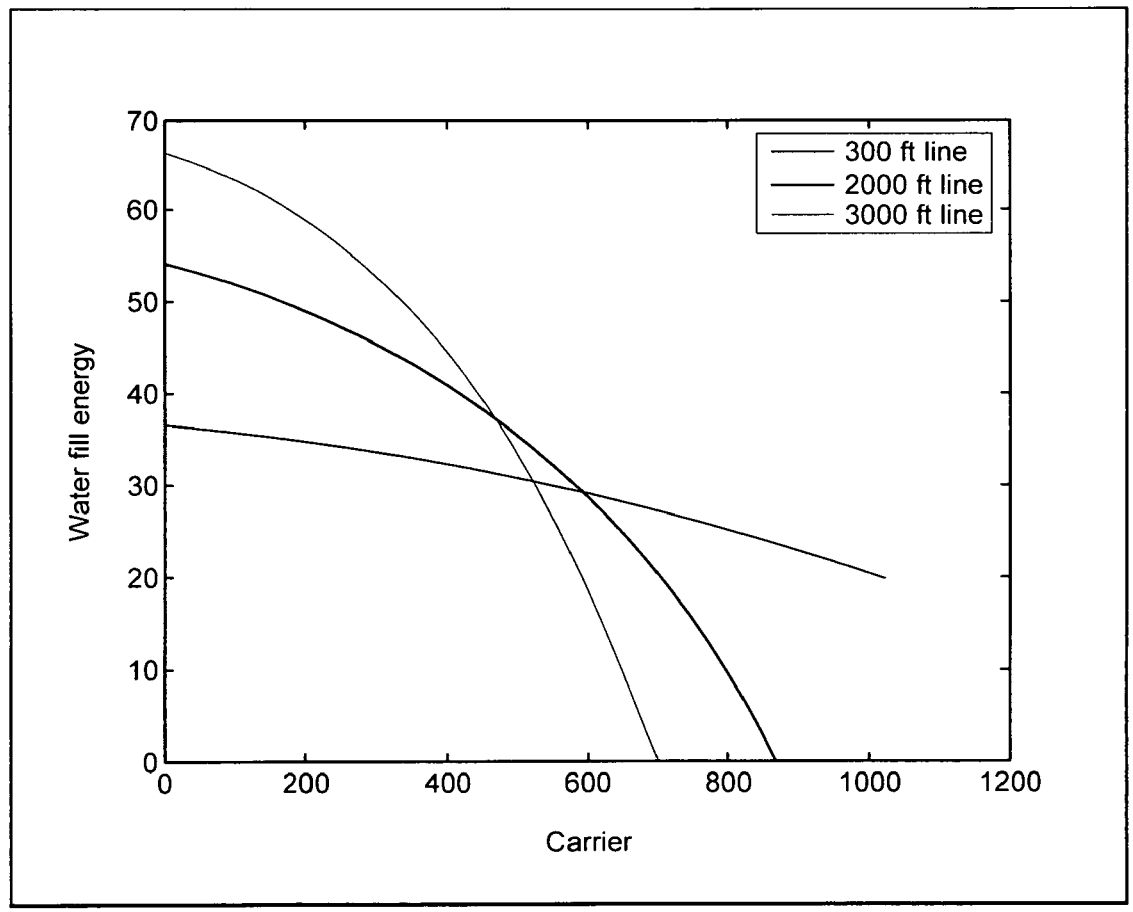
FIG. 2 is a graph illustrating null carriers available in a typical DSL line.
Figure 3:
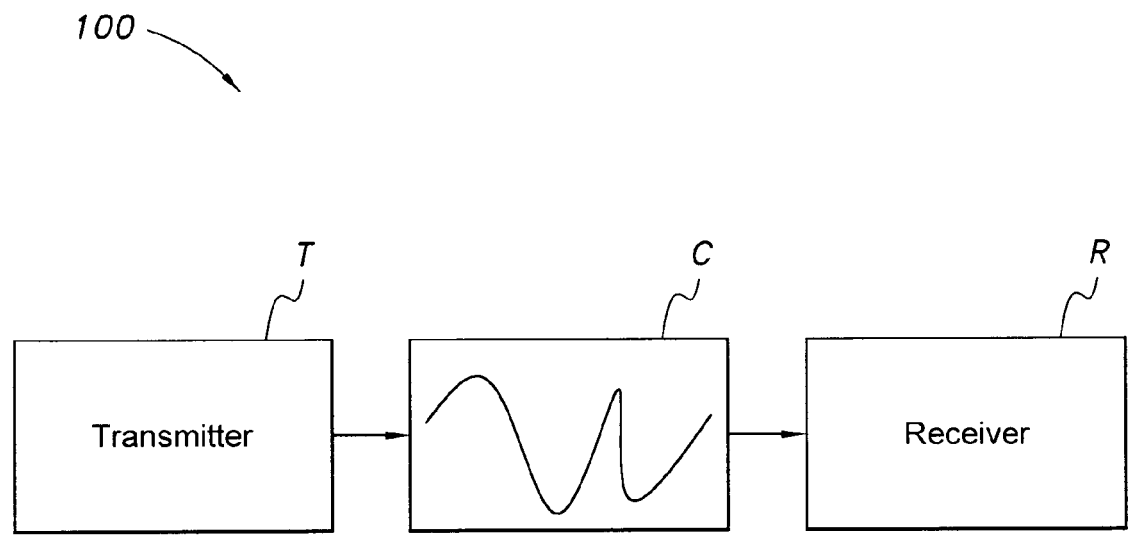
FIG. 3 is a block diagram illustrating a typical prior art OFDM system.

FIG. 1 shows a simplified OFDM system that implements a method of estimating and removing noise in OFDM systems according to the present invention. Data to be transmitted is input into transmitter T, which includes a modulator 102. As will be described in detail below, an inverse fast Fourier transform is performed at 104, and 106 represents cyclic prefix insertion. It should be understood that the calculations necessary to perform these steps may be performed using any suitable type of processor, such as a programmable logic controller or specialized circuit modules integrated into transmitter T.

The resultant signal is delivered as one more channels C to be received by receiver R. As will be described in detail below, the cyclic prefix is removed at 108 and a fast Fourier transform is performed at 110. The actual impulse noise estimation and removal occurs at 112, and at 114, the signal is demodulated and the data is extracted and delivered to the user. It should be understood that the calculations necessary to perform these steps may be performed using any suitable type of processor, such as a programmable logic controller, for example, or specialized circuit modules integrated into receiver R. Transmitter T may be any suitable type of transmitter and receiver R may be any suitable type of receiver. Alternatively, transmitter T and receiver R may be integrated into a single transceiver unit.

As will be described in detail below, the channel may be estimated using blind, semi-blind or pilot-based methods. The impulse noise may be estimated by insertion of free carriers either randomly across the entire available frequency spectrum, or only within the guard bands thereof. Preferably, the impulse noise is estimated by first estimating the coarse support of the impulses, then refining the support of the impulses, and then estimating the amplitudes of the impulses.

Coarse support is preferably performed by a Compressive Sensing (CS) method, which may utilize the Candes-Randall-Tao SOCP Estimator algorithm, the Candes-Randall-Tao LP Estimator algorithm, or the Tropp $l_1$-penalty Estimator algorithm. Refinement of the support may be performed by using a maximum likelihood (ML) method or a maximum a-posteriori probability (MAP) method. Estimation of the amplitudes may be calculated via the least squares (LS) method or the mean square error (MMSE) method. In the OFDM frequency domain channel model given below as equation (6), where ê denotes the resultant estimate of the impulse noise e produced by the compressive sampling algorithm. The signal actually fed to the receiver is given by:

$$\breve{y}=D\breve{x}+F(e-\hat{e})+\breve{z}. \quad (6)$$

In the following, $\Omega \subset Z_n$ denotes the set of frequencies that are not used to send modulation symbols. These frequencies are used to estimate the impulse noise vector e at the receiver R. The inventive method uses the null carriers that are available on the transmission spectrum to detect, estimate, and cancel impulsive noise. The time domain signal is constructed as:

$$x=F^H S_x \breve{d} \quad (7)$$

where d is the frequency-domain data symbol vector having dimension $k \leq n$, and where $S_x$ is an n×k selection matrix containing only one element equal to 1 per column and having m=n−k zero rows. The columns of $S_x$ index the subcarriers that are used for data transmission in the OFDM system. The remaining subcarriers are either not used, or are used for transmitting known pilot symbols in the frequency domain. The known pilot symbols in the frequency domain are not used in the following analysis, since they are used for channel estimation, and these can be easily subtracted from the received signal at the receiver R. Thus, the subcarriers not indexed by columns of $S_x$ are not used. In the following, S denotes the matrix having a single element equal to 1 per column, and that spans the orthogonal complement of the columns of $S_x$.

The frequency domain vector is given by:

$$\breve{y}=Fy=DS_x\breve{d}+Fe+\breve{z} \quad (8)$$

where ž has the same statistics as z, since F is unitary. The estimation of e is derived from projection into the orthogonal complement of the signal subspace. This is given by:

$$y'=S^T\breve{y}=S^T Fe+z' \quad (9)$$

where z' is an i.i.d. Gaussian vector with variance $N_0$ per component, and having a length m. For future usage, the m×n projection matrix obtained by a row selection of F (according to S) is denoted by $\Psi=S^T F$. The observation vector y' is a projection of the n-dimensional impulse noise onto a basis of dimension n−m<n corrupted by the AWGN z'.

Since n<m, there is an underdetermined system of linear equations for finding e which cannot be solved by standard linear estimation. Thus, the essential step in estimating e consists of finding its support $\mathcal{I}$. It is important to note that e is a sparse vector. This support estimate will then be used to estimate the amplitudes of the impulses.

Figure 4:
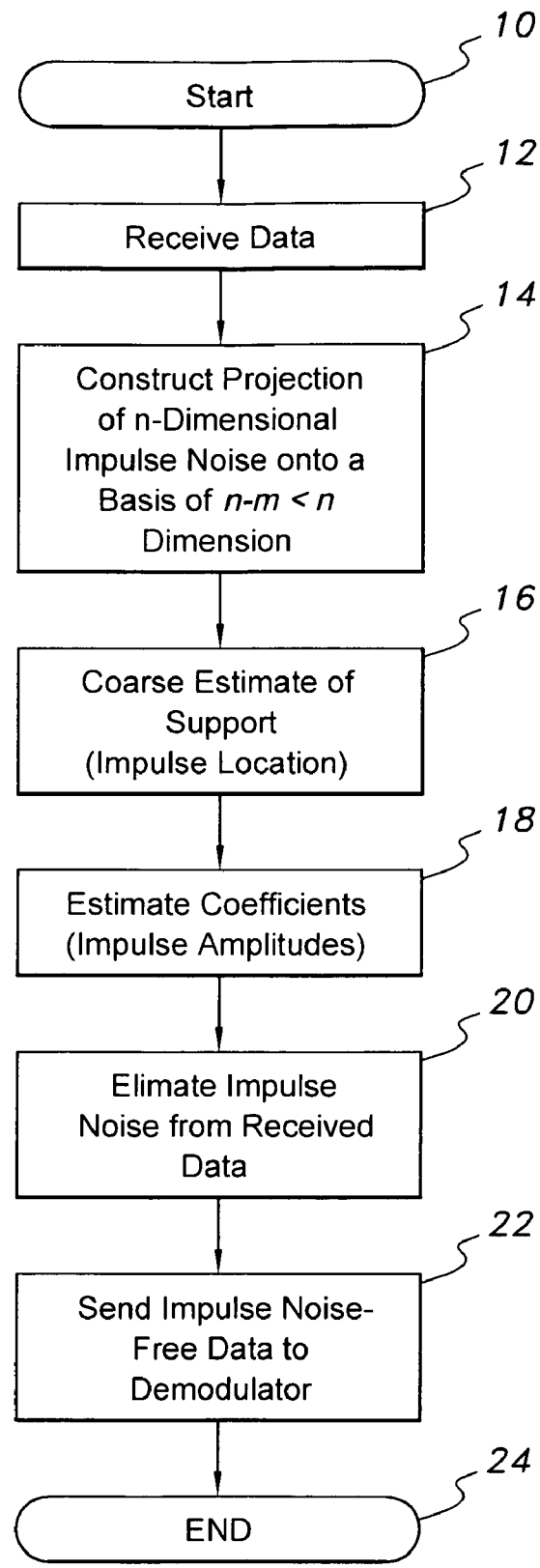
FIG. 4 is a flowchart illustrating method steps of the method of estimating and removing noise in OFDM systems according to the present invention, and particularly illustrating received data being processed to remove impulse noise prior to transmitting the data to a demodulator.

FIG. 4 illustrates, as a brief overview, the method taking place within the receiver R, which begins at 10, with the reception of the data at step 12. As described directly above, a projection of n-dimensional impulse noise is constructed, with the projection being projected onto a basis of n−m<n dimension (step 14). A coarse estimate of the support (i.e., the impulse location) is calculated at step 16 (to be described in detail below, with particular reference to FIG. 5). The coefficients, or impulse amplitudes, are then estimated at step 18, and with these estimations, the impulse noise is eliminated from the received data at step 20. The impulse noise-free data is then sent to demodulator 114 (of FIG. 1) at step 22 to produce the noise-free signal, ending the process at step 24.

Figure 5:
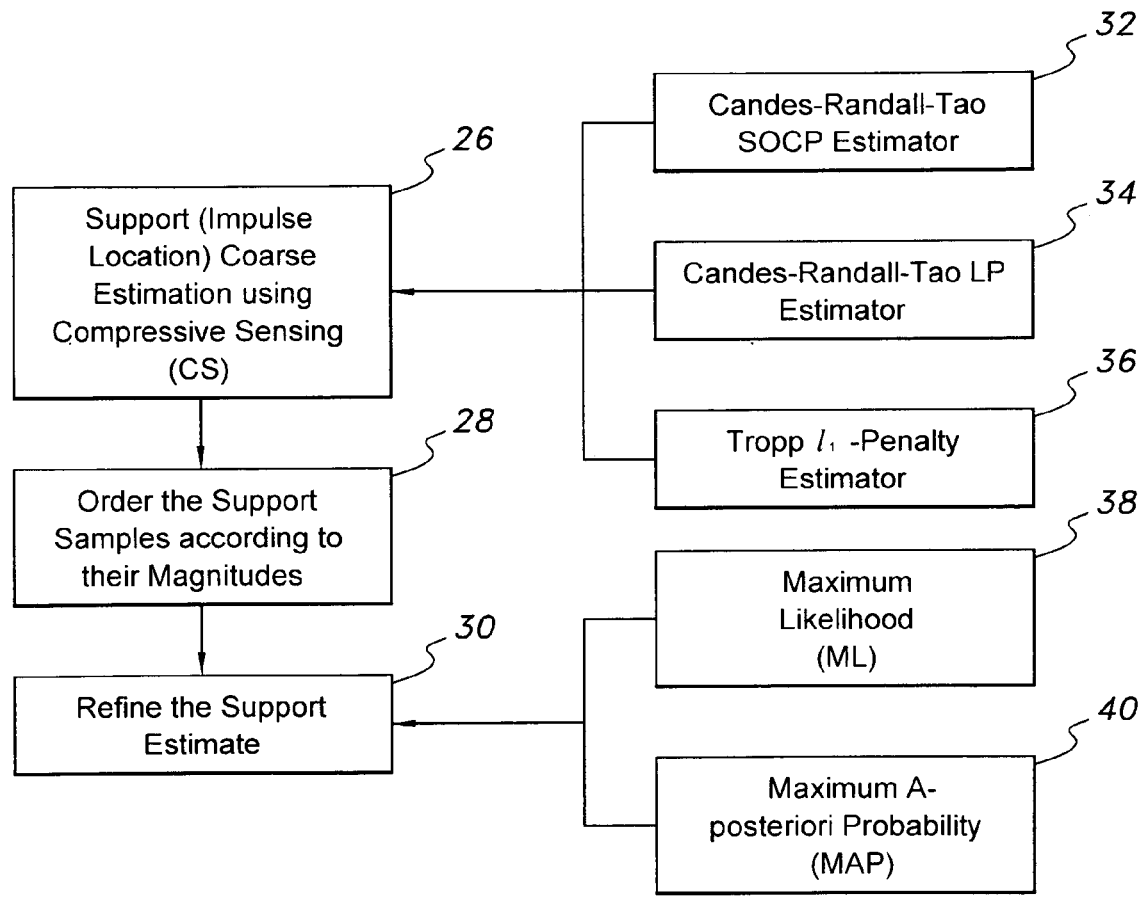
FIG. 5 is a block diagram illustrating impulse noise support being estimated using compressive sensing and then refined via a maximum likelihood or maximum a-posteriori probability technique in a method of estimating and removing noise in OFDM systems according to the present invention.

FIG. 5 illustrates the technique used for estimating the coarse estimate of the support. The support, or impulse location, coarse estimation utilizes Compressive Sensing (CS), beginning at step 26. The support samples are ordered according to their magnitudes at step 28, and the support estimate is refined at step 30. The support coarse estimation may be performed using the Candes-Randall-Tao SOCP estimator algorithm, the Candes-Randall-Tao LP estimator algorithm or the Tropp $l_1$-Penalty estimator algorithm.

The Candes-Randall-Tao SOCP estimator is formulated for the real numbers. Using the notation given above, the Candes-Randall-Tao SOCP estimator is given by the following:

$$\text{minimize } \|\hat{e}\|_1, \text{subject to } \|y'-\Psi\hat{e}\|_2 \leq \epsilon \quad (10)$$

for some small enough selected estimation factor $\epsilon$.

The Candes-Randall-Tao LP estimator (also known as the Dantzig selector) is used for real vectors, and is given by the following:

$$\text{minimize } \|\hat{e}\|_1, \text{subject to } \|w-\Psi\hat{e}\|_\infty \leq \lambda \quad (11)$$

for some small enough selected estimation factor $\lambda$.

The Tropp $l_1$-penalty estimator considers a third, non-equivalent way of performing sparse approximation/estimation:

$$\text{minimize} \frac{1}{2}\|y' - \Psi \tilde{e}\|_2^2 + \gamma \|\tilde{e}\|_1 \quad (12)$$

where the parameters $\epsilon$, $\lambda$ and $\gamma$ are related to the AWGN variance $N_0$. One or a combination of the three above algorithms are used to estimate the support $\mathscr{I}(e)$.

FIG. 5 further illustrates the refinement of the coarse estimate of support at 30, which may be performed by either a maximum likelihood (ML) method (at 38) or by a maximum a-posteriori probability (MAP) method (at 40). Considering the case where e is Bernoulli-Gaussian with parameters p and $I_0$ (as specified above), then to optimally estimate the support of e (denoted by $\mathscr{I}_e$), from the observation y', the a priori probability of $\mathscr{I}_e$ depends only on its size $J=|\mathscr{I}_e|$ (i.e., the number of non-zero components). For a given binary vector b of Hamming weight r, $P(\mathscr{I}_e=b)=P(|\mathscr{I}_e|=r)=p^r(1-p)^{n-r}$. The maximum a-posteriori probability rule (also known as the optimal Bayesian estimation rule) is given by $\hat{J}=\text{argmax}_J P(J|y')$.

Up to an insignificant proportionality factor, the joint probability (density) $P(\mathscr{I},y)$ (i.e., the MAP matrix) can be maximized as:

$$p(y'|J)P(J) = p^{|J|}(1-p)^{n-|J|} \frac{\exp\left(-\frac{1}{N_O}(y')^H \sum(J)^{-1} y'\right)}{\det(\sum(J))} \quad (13)$$

where the covariance matrix of y', given $\mathscr{I}$, normalized by the noise variance, is given as:

$$\sum(J) = \frac{1}{N_O} \mathbb{E}[y'(y')^H | J] = I + \frac{I_O}{N_O}\Psi(J)\Psi(J)^H \quad (14)$$

where $\Psi=S^TF=[\psi_1, \ldots, \psi_n]$, and where $\Psi(\mathscr{I})$ denotes the submatrix formed by the columns $\{\psi_j: j \in \mathscr{I}\}$, indexed by the support $\mathscr{I}$. This relies on the fact that, under the support hypothesis $\mathscr{I}_e=\mathscr{I}$, the observation y' is conditionally Gaussian with covariance $N_0\Sigma(\mathscr{I})$. It should be noted that $I_0/N_0$ is the impulse-to-noise ratio (INR).

An optimal MAP support detector should test each hypothesis and find the one that maximizes the MAP metric given above. Even by limiting to a subset of most probable supports (i.e., of weight at most $r_{max}$ for some reasonable value of $r_{max} > np$), this scheme is prohibitively complex. However, the following augmented CS scheme may be used effectively. A CS algorithm is used in order to find a set of candidate positions. Letting ê denote the estimated impulse vector from the CS algorithm, then its components are sorted in decreasing order of magnitude, and the candidate supports are considered as: $\mathscr{I}_0=0$ (i.e., no impulses); $\mathscr{I}$ containing a single 1 in the position of the largest element of ê; $\mathscr{I}$ containing two 1's in the position of the two largest elements of ê . . . and so on, until a maximum number $r_{max} > np$ of ones is reached. The support is selected as the one that maximizes the MAP metric among the above set of candidates.

As an alternative, e may be treated as unknown and arbitrary, with support $\mathscr{I}_e$. Thus, given the support $\mathscr{I}_e$, the only known regarding y' is that it is formed by a vector in the subspace spanned by the columns of $\Psi(\mathscr{I}_e)$ plus a white Gaussian noise vector z'. The conditional density of y' given $\mathscr{I}_e$ is proportional to the negative exponential of the projection of y' on the orthogonal complement of the span of the columns of $\Psi(\mathscr{I}_e)$. It follows that the corresponding MAP metric of the hypothesis $\mathscr{I}_e=\mathscr{I}$ becomes:

$$p(y'|J)P(J) = p^{|J|}(1-p)^{n-|J|} \exp\left(-\frac{1}{N_O}\|P(J)^\perp y'\|^2\right) \quad (15)$$

where $P(J)^\perp = I - \Psi(J)(\Psi(J)^H\Psi(J))^{-1}\Psi(J)^H$ is the orthogonal projector onto the orthogonal complement of the subspace spanned by the columns of $\Psi \mathscr{I}$.

Figure 6:
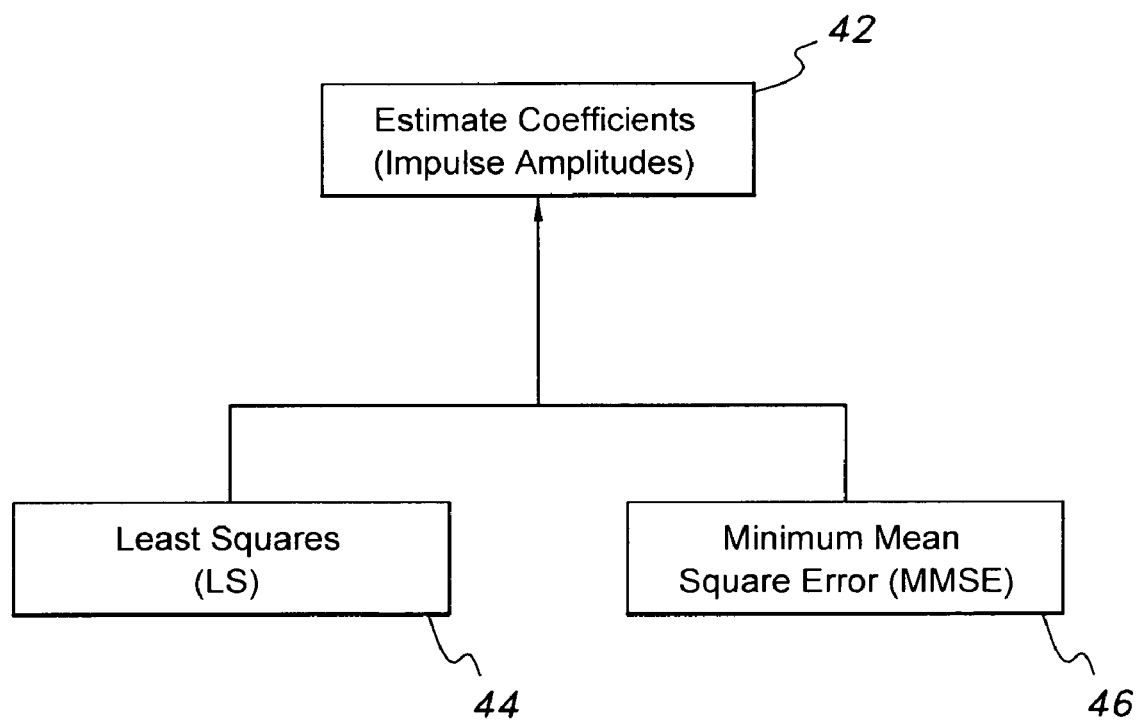
FIG. 6 is a block diagram illustrating impulse noise amplitudes being estimated using least squares or minimum mean square error techniques in a method of estimating and removing noise in OFDM systems according to the present invention.

As shown in FIG. 6, this support estimate is used in the estimation of coefficients (i.e., the impulse amplitudes). Estimation of the coefficients (at 42) is performed by either the least squares (LS) method (at 44) or by a minimum mean square error (MMSE) method (at 46). Assuming that the estimate of $\mathscr{I}$ is correct, then the LS or MMSE estimation is applied for the non-zero components $u_e$ of e, thus reconstructing $\hat{e} = \hat{S}_e \hat{u}_e$, where $\hat{S}_e$ is the selection matrix corresponding to $\hat{I}$. However, $e=\hat{S}_e u_e$, so the impulse amplitudes can be estimated as $y'=S^T F \hat{S}_e u_e + z' \triangleq \phi_e u_e + z'$.

Thus, the least-squares estimate is given by $$\hat{u}_e^{ls} = (\Phi_e^H \Phi_e)^{-1} \Phi_e^H y',$$

which provides the corresponding LS estimate of e as $\hat{e}^{ls} = \hat{S}_e(\phi_e^H \phi_e)^{-1} \phi_e^H y$.

The MMSE estimates are given by $$\hat{u}_e^{mmse} = \Phi_e^H \left(\frac{N_O}{I_O} I + \Phi_e \Phi_e^H\right)^{-1} y',$$

and $$\hat{e}^{mmse} = \hat{S}_e \Phi_e^H \left(\frac{N_O}{I_O} I + \Phi_e \Phi_e^H\right)^{-1} y'.$$

Figure 7:
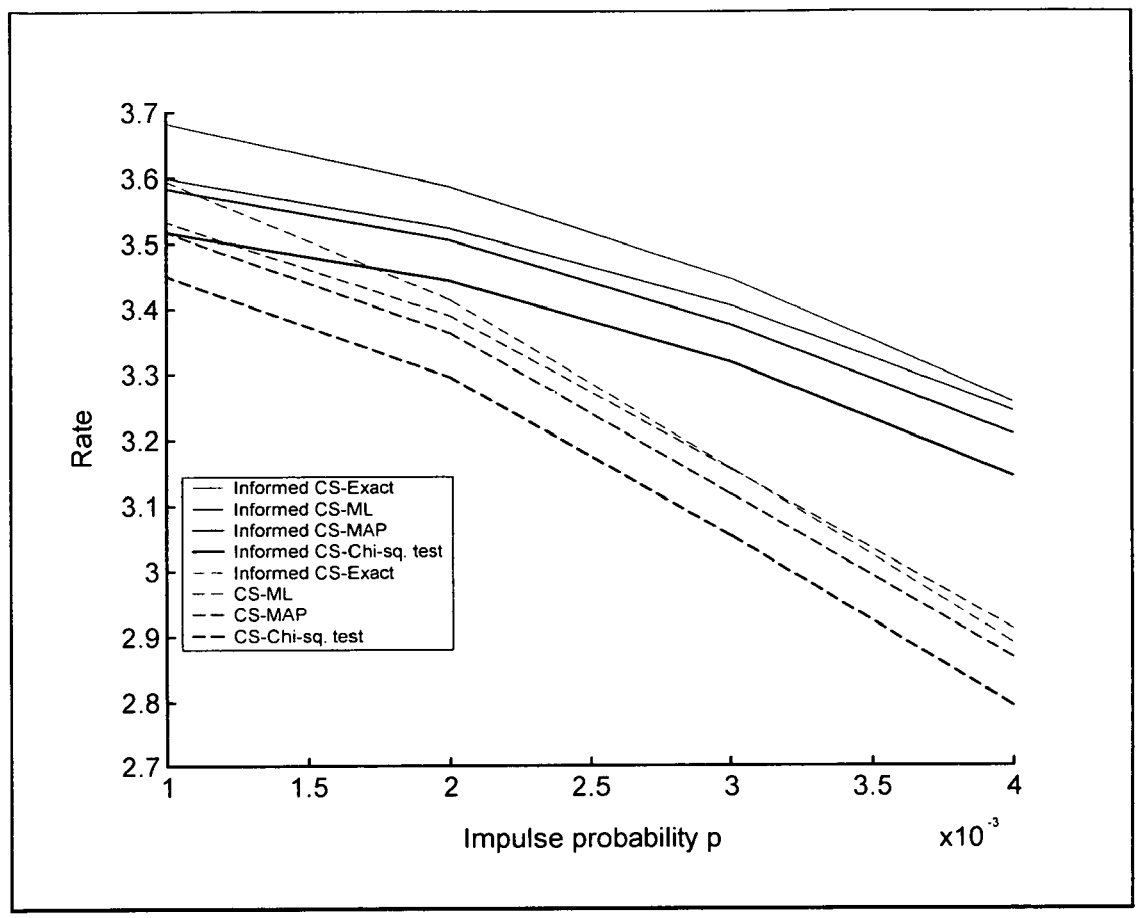
FIG. 7 is a graph illustrating support recovery utilizing a variety of methods, with noise being estimated using the least squares technique.
Figure 8:
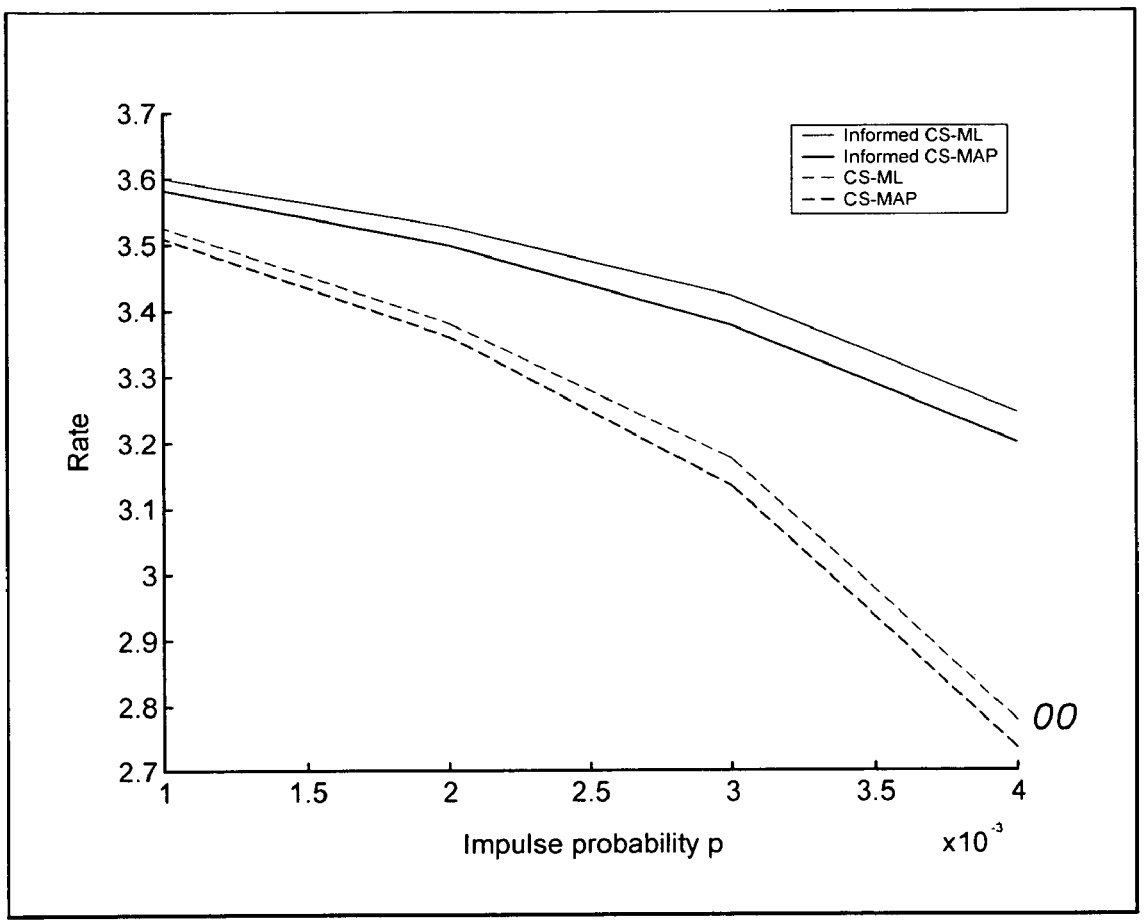
FIG. 8 is a graph illustrating the support recovery utilizing a variety of methods, with noise being estimated using the minimum mean square error technique.

FIG. 7 illustrates support recovery as impulse probability p vs. rate, showing the comparison between the CS exact method, the CS ML method, the CS MAP method, and a CS chi-squared test, with noise being estimated using the least squares technique. FIG. 8 similarly shows the support recovery utilizing the informed CS-ML method, the informed CS-MAP method, the CS-ML method and the CS-MAP method, with noise being estimated using the minimum mean square error technique.

Figure 9:
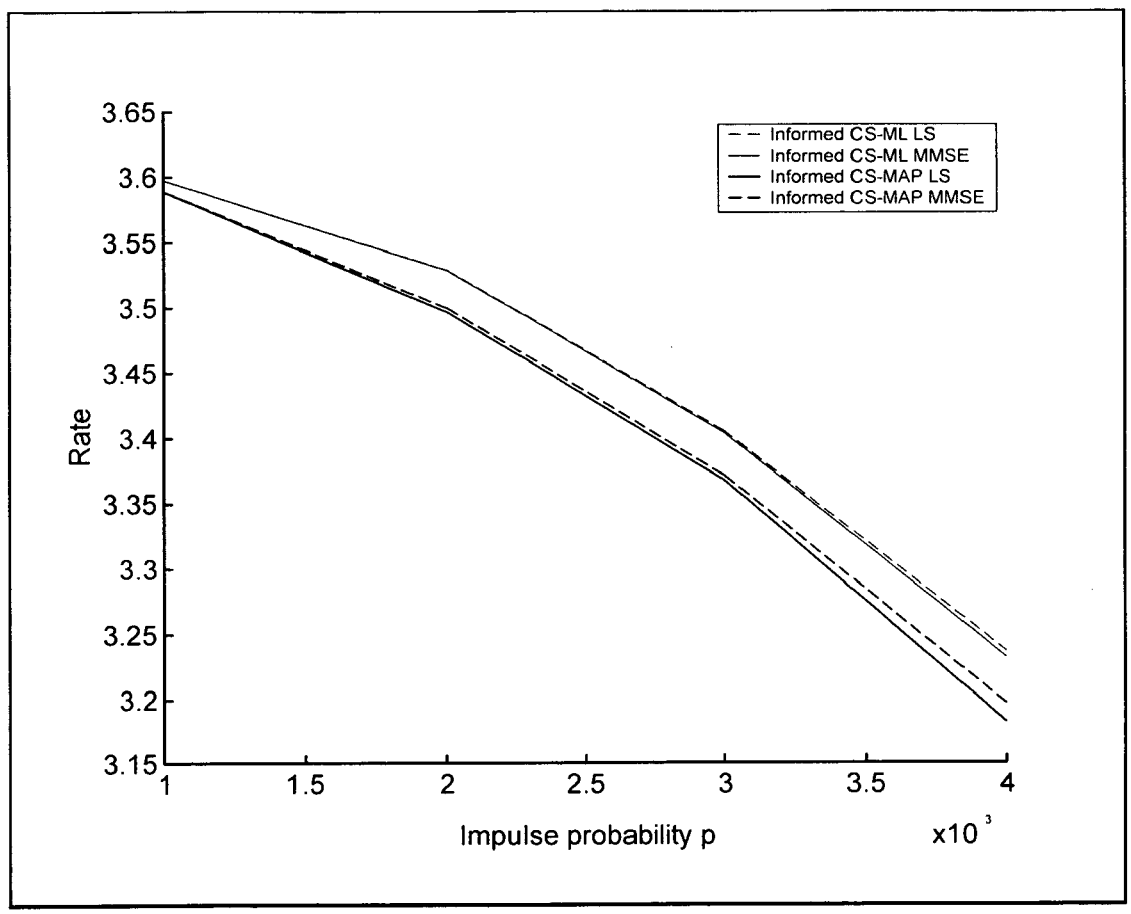
FIG. 9 is a graph illustrating the comparison between least squares and minimum mean square error techniques for an informed receiver.
Figure 10:
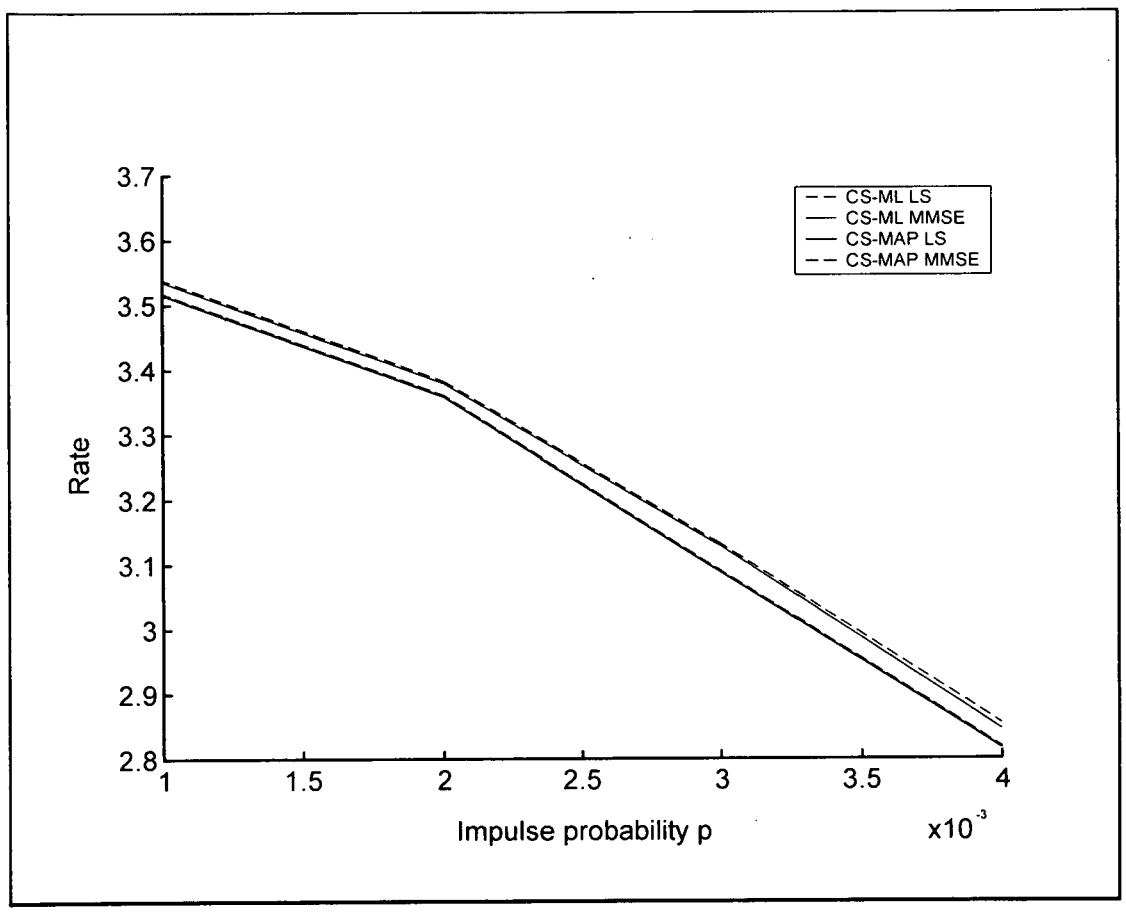
FIG. 10 is a graph illustrating the comparison between least squares and minimum mean square error techniques for an uninformed receiver.
Figure 11:
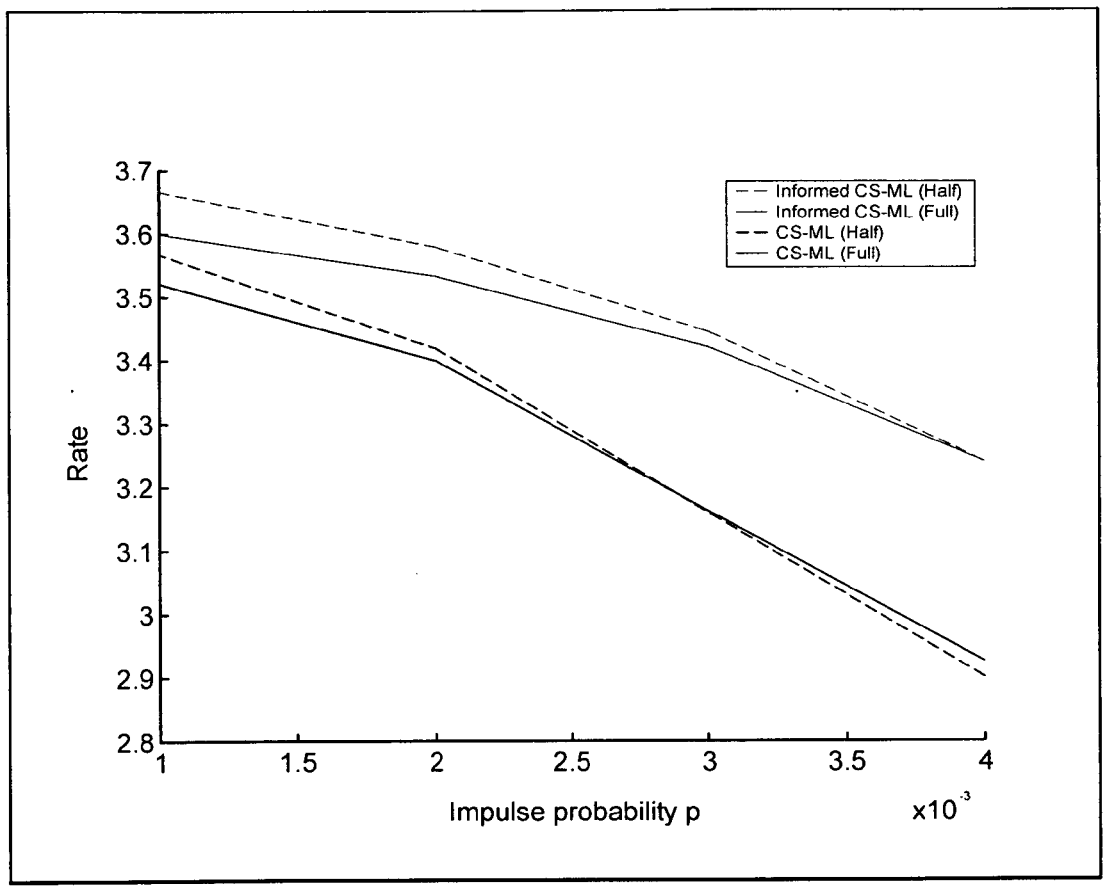
FIG. 11 is a graph illustrating a comparison of half band vs. full band using the maximum likelihood technique.
Figure 12:
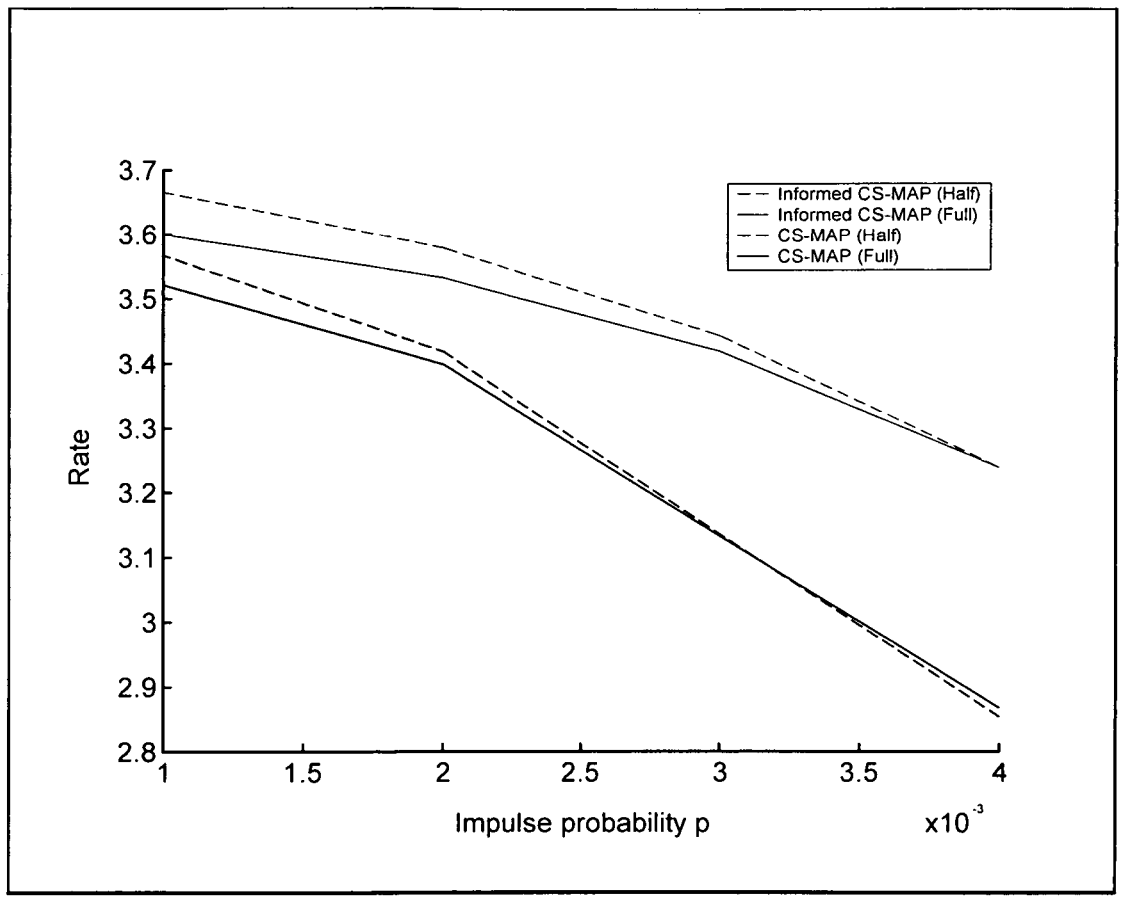
FIG. 12 is a graph illustrating a comparison of half band vs. full band using the maximum a-posteriori probability technique.

FIG. 9 is a graph illustrating the comparison between least squares and minimum mean square error techniques for an informed receiver. Similarly, FIG. 10 illustrates the comparison between the least squares and minimum mean square error techniques for an uninformed receiver. FIG. 11 is a graph illustrating a comparison of half band vs. full band using the maximum likelihood technique, showing the impulse probability plotted against the rate, and FIG. 12 similarly illustrates a comparison of half band vs. full band using the maximum a-posteriori probability technique.

It is to be understood that the present invention is not limited to the embodiments described above, but encompasses any and all embodiments within the scope of the following claims.

We claim:

1. A method of estimating and removing noise in OFDM systems, comprising the steps of:
    receiving a set of OFDM symbols from a channel on a receiver, the set representing transmission of modulated data after an inverse Fourier transform and insertion of a cyclic prefix;
    removing the cyclic prefix from the set of OFDM symbols;
    performing a fast Fourier transform on the set of OFDM symbols;
    estimating impulse noise in the transformed set of OFDM symbols;
    canceling the impulse noise in the transformed set of OFDM symbols based upon the estimated impulse noise to produce a set of impulse noise-free data;
    estimating the channel utilizing a pilot-based method;
    demodulating and detecting the transmitted modulated data based upon the estimated channel and the set of impulse noise-free data; and
    wherein the step of estimating the impulse noise includes insertion of free carriers across a frequency spectrum, the free carriers being inserted randomly.

2. The method of estimating and removing noise in OFDM systems as recited in claim 1, wherein the free carriers are randomly inserted in the guard bands of the frequency spectrum.

3. The method of estimating and removing noise in OFDM systems as recited in claim 1, wherein the step of estimating the impulse noise comprises the steps of:
    estimating a coarse support of impulses;
    refining the support of the impulses; and
    estimating amplitudes of the impulses.

4. The method of estimating and removing noise in OFDM systems as recited in claim 3, wherein the step of estimating the coarse support of the impulses includes a Compressive Sensing method.

5. The method of estimating and removing noise in OFDM systems as recited in claim 4, wherein the Compressive Sensing method utilizes the Candes-Randall-Tao SOCP Estimator method.

6. The method of estimating and removing noise in OFDM systems as recited in claim 4, wherein the Compressive Sensing method utilizes the Candes-Randall-Tao LP Estimator method.

7. The method of estimating and removing noise in OFDM systems as recited in claim 4, wherein the Compressive Sensing method utilizes the Tropp $l_1$-penalty Estimator method.

8. The method of estimating and removing noise in OFDM systems as recited in claim 3, wherein the step of refining the support includes calculation of a maximum likelihood.

9. The method of estimating and removing noise in OFDM systems as recited in claim 3, wherein the step of refining the support includes calculation of a maximum a posteriori probability.

10. The method of estimating and removing noise in OFDM systems as recited in claim 3, wherein the step of estimating the amplitudes of the impulses includes a least squares method.

11. The method of estimating and removing noise in OFDM systems as recited in claim 3, wherein the step of estimating the amplitudes of the impulses includes a minimum mean square error method.

12. The method of estimating and removing noise in OFDM systems as recited in claim 1, wherein the step of estimating the channel utilizes a blind estimation method.

13. The method of estimating and removing noise in OFDM systems as recited in claim 1, wherein the step of estimating the channel utilizes a semi-blind method.

14. The method of estimating and removing noise in OFDM systems as recited in claim 1, wherein the step of estimating the channel utilizes a pilot-based method.

15. An OFDM system for estimating and removing noise in a received transmission, comprising a transceiver having a receiver and a transmitter, the transmitter having:
    a modulator for modulating data to be transmitted;
    means for performing an inverse fast Fourier transform on the modulated data; and
    means for inserting a cyclic prefix into the transformed, modulated data, wherein the transmitter transmits the transformed, modulated data as a set of OFDM symbols via a channel;
    the receiver receiving the set of OFDM symbols and having:
    means for performing a fast Fourier transform on the set of OFDM symbols;
    means for estimating impulse noise in the transformed set of OFDM symbols;
    means for canceling the impulse noise in the transformed set of OFDM symbols based upon the estimated impulse noise to produce a set of impulse noise-free data;
    means for estimating the channel; and
    means for demodulating and detecting the data transmitted based upon the estimated channel and the set of impulse noise-free data.

16. An OFDM system for estimating and removing noise in a received transmission, comprising:
    a transmitter having:
        a modulator for modulating data to be transmitted;
        means for performing an inverse fast Fourier transform on the modulated data; and
        means for inserting a cyclic prefix into the transformed, modulated data, wherein the transmitter transmits the transformed, modulated data as a set of OFDM symbols via a channel;
    a receiver receiving the set of OFDM symbols and having:
        means for removing the cyclic prefix from the set of OFDM symbols;
        means for performing a fast Fourier transform on the set of OFDM symbols;
        means for estimating impulse noise in the transformed set of OFDM symbols;
        means for canceling the impulse noise in the transformed set of OFDM symbols based upon the estimated impulse noise to produce a set of impulse noise-free data;
        means for estimating the channel; and
        means for demodulating and detecting the data transmitted based upon the estimated channel and the set of impulse noise-free data.

* * * * *